Patented July 6, 1943

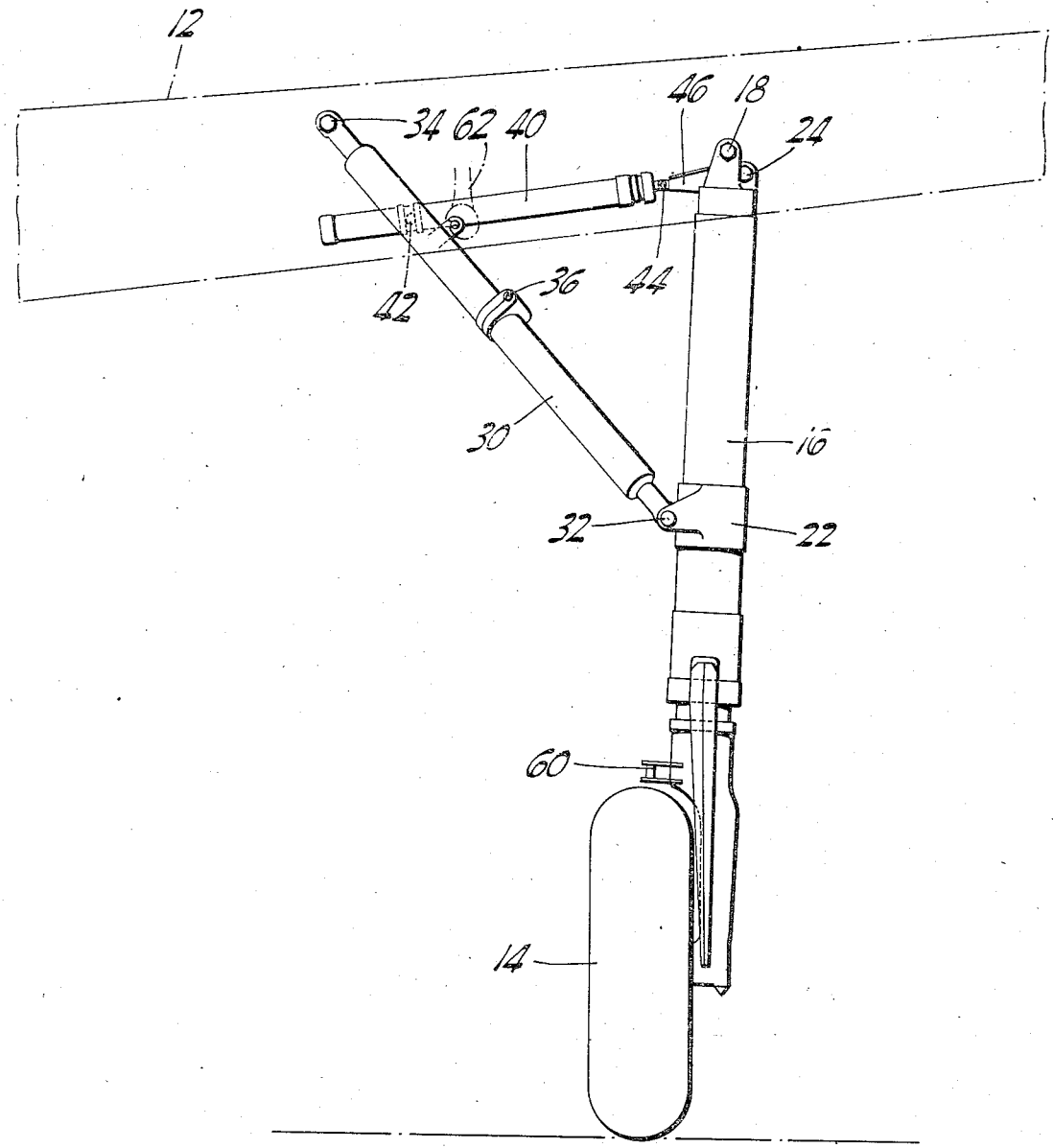

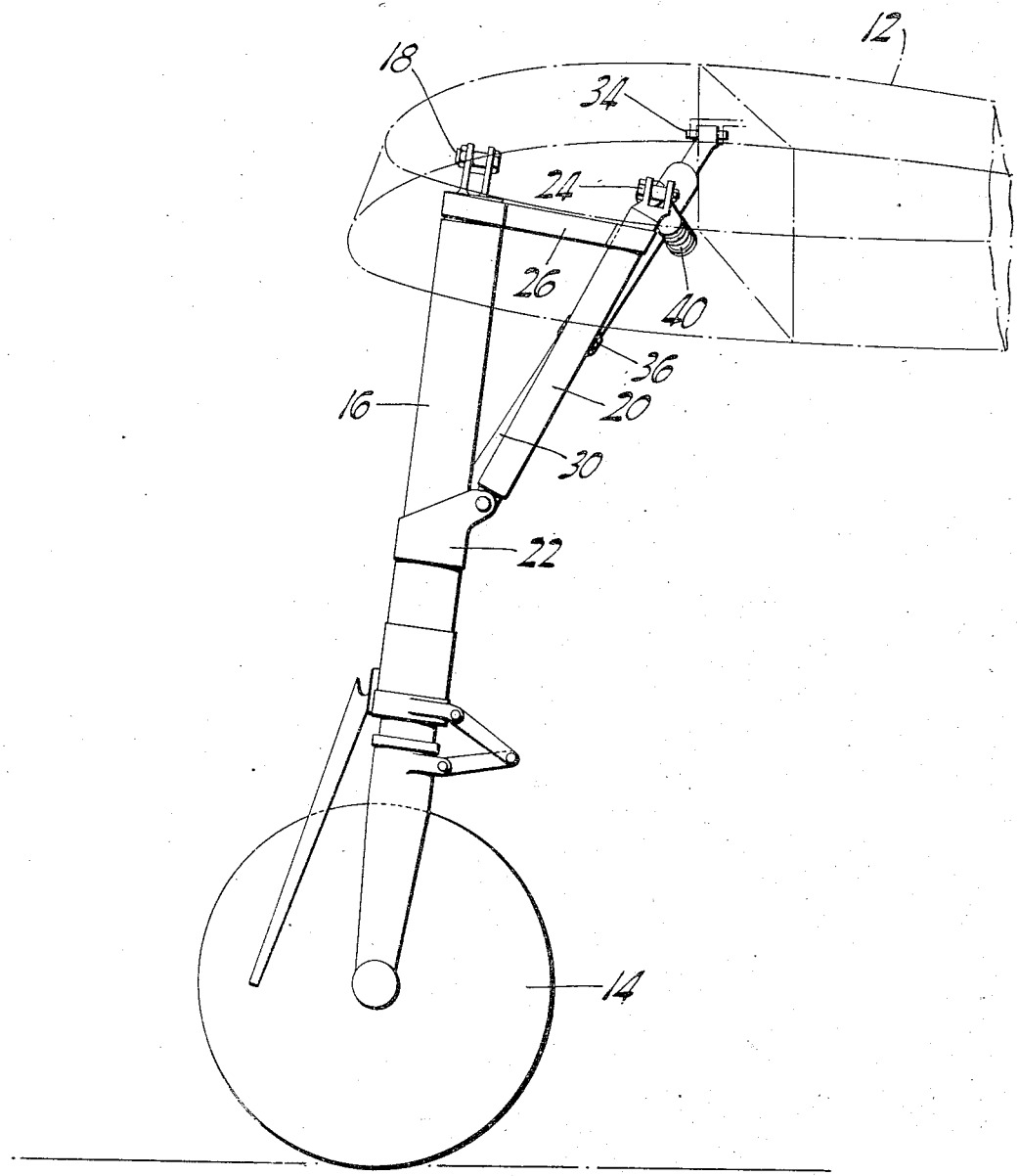

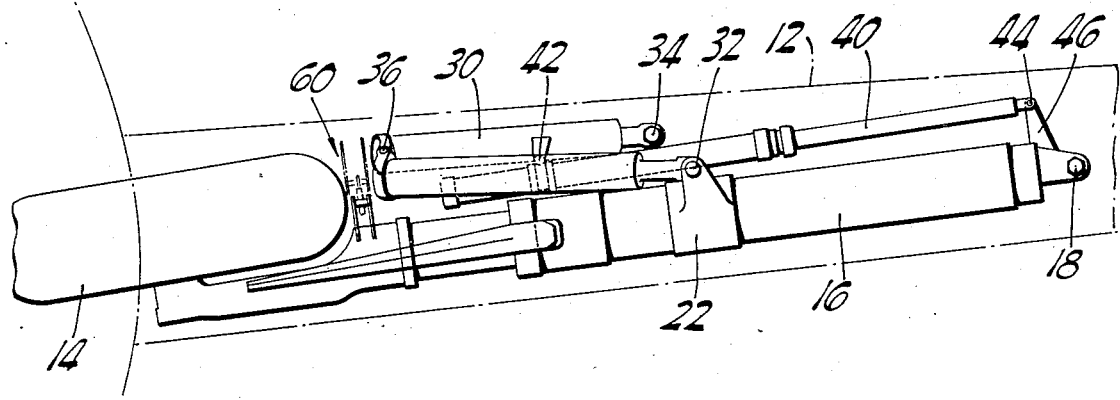
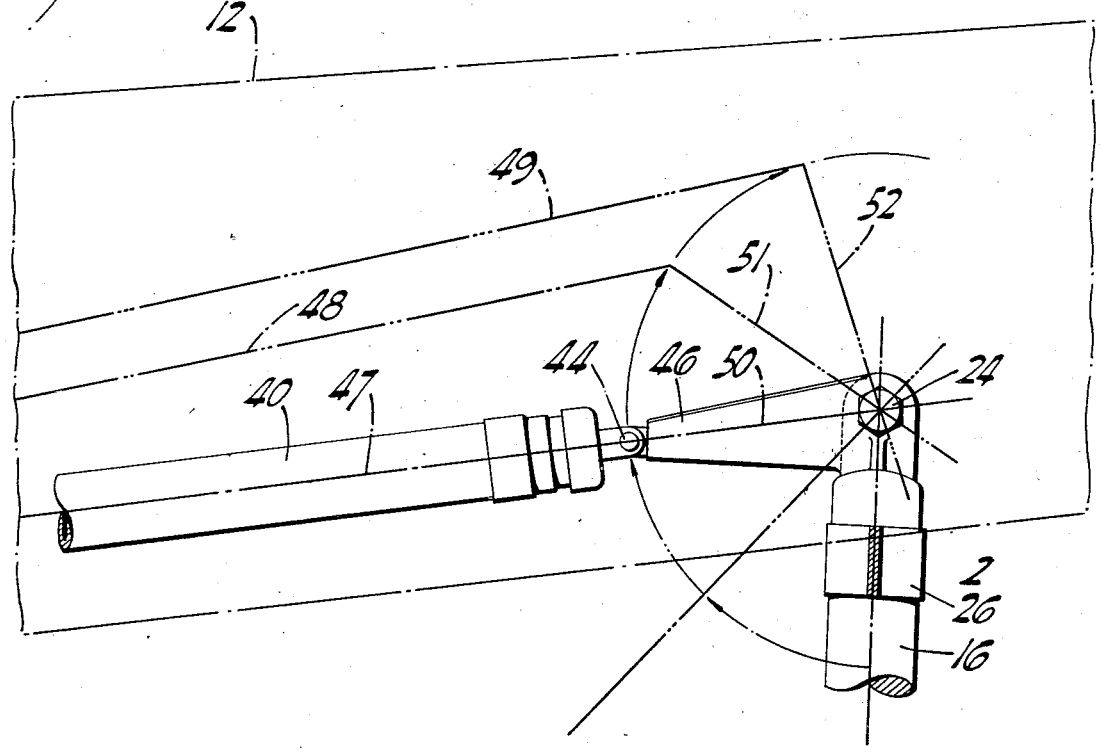

2,323,385

UNITED STATES PATENT OFFICE 2,323,385

AIRPLANE RETRACTIBLE LANDING GEAR

Edwyn A. Eddy, Stewart Manor, Long Island, N. Y., assignor to Brewster Aeronautical Corporation, Long Island City, N. Y.

Application October 2, 1940, Serial No. 359,406

7 Claims. (Cl. 244—102)

This invention relates to aircraft, and more particularly to retractible landing gears for airplanes.

One object of the invention is to provide an improved landing gear of the character described which is rugged and stable under all operating conditions, and yet which comprises essentially a relatively small number of operating parts and structural elements.

Another object is to provide a retractible landing gear adapted to be mounted upon an airplane wing and so organized and arranged as to be particularly adapted to compactly nest within a relatively small space such as is normally provided by an airplane wing section, when retracted.

Another object of the invention is to provide in a landing gear of the character described a folding strut retraction-extension actuating mechanism of an improved character.

Another object is to provide a retraction-extension mechanism for an airplane landing gear adapted to function in such manner as to impose a more uniform loading upon the actuating elements thereof throughout the cycles of gear retraction and extension.

Other objects and advantages of the invention will appear from the specification herein.

In the drawings:

Fig. 1 is a front elevation of an airplane landing gear structure of the invention in extended condition;

Fig. 2 is a side elevation of the device of Fig. 1;

Fig. 3 is a front elevation corresponding to Fig. 1 but showing the landing gear structure thereof in retracted position; and Fig. 4 is an enlarged view of a detail of the device of Fig. 1 illustrating diagrammatically the relative positions of certain elements of the device when in different positions of retraction.

The drawings illustrate the invention by way of showing a single landing wheel and the mounting mechanism thereof, and it will be understood that the device illustrated by the drawings constitutes one-half of a duo-wheel type landing gear of an airplane in which the device illustrated by the drawings will be duplicated at an opposite side of the plane of symmetry of the airplane. The invention is therefore illustrated in conjunction with an airplane comprising a fuselage 10 and a wing panel 12 extending laterally from the fuselage; and it will be understood that in connection with the conventional form of airplane there will be a similar wing panel extending from the opposite side of the fuselage 10 and that the landing gear structure illustrated and described hereinbelow will be duplicated in conjunction with the opposite wing panel so as to provide a complete duo-wheel landing gear for the airplane.

The wheel supporting gear of the invention is illustrated in conjunction with a landing wheel 14 rotatably carried at the lower end of a main shock absorbing type strut 16; and it will be understood that the wheel and the shock absorbing strut may be generally of any suitable form. The main strut 16 is pivotally mounted at its upper end upon the wing panel 12 by means of a substantially horizontal pivot pin 18 which connects the strut to a fixed bracket portion (not shown) of the wing panel. The strut 16 is braced longitudinally of the airplane by means of a diagonal strut 20 (Fig. 2) which connects at its lower end to a bracket 22 mounted as an integral part of the strut 16, and is pivotally connected at its upper end to a fixed bracket portion (not shown) of the wing panel by means of a pivot pin 24 disposed in line with the pivot pin 18. The strut 16 and the diagonal brace 20 are relatively braced at their upper ends by means of a fixed transverse brace 26. Thus, the shock strut 16 and diagonal strut 20 are free to pivot as a unit about an axis defined by the pivot pins 18 and 24 from the extended position of the gear illustrated in Fig. 1 to the retracted position thereof which is illustrated in Fig. 3 wherein the landing wheel and supporting gear are completely nested within the wing panel and the fuselage of the airplane.

To control and motivate the gear a folding strut 30 is provided to pivotally connect at its lower end with the bracket 22 by means of a pivot pin 32 and at its upper end with a fixed bracket portion (not shown) of the wing panel by means of a pivot pin 34. The strut 30 is hinged at 36 so as to be adapted to "break" open to the left as viewed in Fig. 1. A hydraulic jack 40 is operatively connected in the manner of a strut at one of its ends to the folding strut 30 by means of a pivot pin 42 and at its opposite end to the main strut 16 through means of a pivotal connection 44 with a crank arm 46 which extends laterally from the upper end of the main strut 16 as an integral portion thereof. The crank arm 46 and the jack 40 are so relatively arranged that in the extended position of the gear the line of action of the jack is disposed substantially in line with the axis of the pivot connection 24. When the gear is in this condition the jack 40 is contracted and the folding strut 30 is in its straightened condition. Thus, the folding strut 30 functions as a rigid diagonal brace between the main strut 16 and the wing panel 12 to brace the landing wheel laterally with respect to the airplane; and it will be understood that when the gear is in fully extended position the main strut 16 is thus braced relative to the wing panel 12 against movement in any direction.

Upon extension of the jack 40, however, as upon introduction of fluid under pressure within the hydraulic cylinder mechanism thereof, the force of the expanding jack bears laterally against the folding strut 30 between its pivoted end portions, and thus breaks the strut 30 about its hinge pin 36. Thus, the lower end of the strut 30 will be drawn upwardly and the main strut 16 will thereby be pivoted inwardly toward the left as viewed in Fig. 1 and upwardly toward the wing panel. As the extension of the jack 40 continues and as the main strut 16 rotates upon the pivot pins 18—24 from its fully extended position the crank arm 46 at the top end of the main strut simultaneously rotates clockwise as diagrammatically illustrated in Fig. 4 through successive center line positions 51—52 corresponding to center line positions 48—49 of the hydraulic jack. Thus, as the crank arm 46 moves clockwise it progresses through successive attitudes wherein its dimensional component transverse to the line of action of the jack 40 is increased, until, for example, when the center line of the crank 46 is at 51 the line of action of the jack has been shifted from 47 to 48, and the jack is now acting upon the crank 46 through a substantial moment arm about the pivot pin 24. Consequently, the jack 40 is now operating to rotate the main strut 16 about the pivot line 18—24 through additional application of forces through the crank arm 46; and as the relatively heavy portions of the gear continue to swing upwardly with movements having increasing vertical components the forces of the jack operate upon the crank 46 through still further increasing moment arms. Simultaneously, the line of action of the jack 40 upon the folding strut 30 is altered by reason of the upward movement of the pivot 44 in such manner as to increase the moment arm of the action of the jack upon the folding strut relative to the pivot 34. Hence, through proper proportioning of the actuating elements of the mechanism the loads upon the jack and connecting devices are arranged to be substantially uniform throughout the cycle of retraction of the gear. The actuating parts of the gear are so proportioned and arranged that the gear finally disposes itself within the wing panel 12 in the manner illustrated in Fig. 3; and it will be seen that the elements of the structure are adapted to nest themselves completely within the contour of the wing panel with utmost facility and compactness, and occupy a minimum of space therewithin.

It will be understood that during extension of the gear the forces of gravity will operate to assist the hydraulic jack 40 to actuate the operating elements of the gear through a reverse order of movement with respect to that hereinabove described in connection with retraction of the gear; but that in all cases the loads upon the mechanism will be substantially uniform and free of excessive peaks and as would otherwise require use of heavier structural elements in order to maintain a proper safety factor. It will also be understood that the hydraulic jack 40 will be controlled by any suitable hydraulic pressure system such as are presently known in the art, and that the operation of the duplicate landing gear structure at the opposite side of the airplane fuselage may be coordinated with the operation of the structure illustrated in the drawings so that a single pilot control device will control the complete duo-wheel landing gear of the airplane. It will also be understood that suitable locking devices may be employed in conjunction with the elements of the landing gear structure hereinabove described and illustrated. For example, lock devices may be provided at 60 (Fig. 3) and at 62 (Fig. 1) so that in either position of extension or retraction the gear may be locked against accidental displacement therefrom, but that such devices are purely accessory to the present invention and may be of any desired form. Also, it will be understood that in lieu of the hydraulic jack device 40, any other suitable form of actuating motor may be employed to procure the required motivation of the operating elements of the gear as explained hereinabove, and that although only one form of the invention has been shown and described in detail, it will be apparent to those skilled in the art that the invention is not so limited but that various changes may be made therein without departing from the spirit of the invention or the scope of the appended claims.

What is claimed is:

1. A retractable aircraft landing gear comprising a main strut pivotally mounted upon a stationary portion of the aircraft by means of a connection device and having a crank arm portion, a folding strut pivotally connected at one of its ends to said main strut at a position spaced from said connection device and at the other of its ends to a second stationary portion of said aircraft so as to provide a diagonal brace for said main strut when the gear is in extended position, and extensible-contractable control means such as a hydraulic jack pivotally mounted by means of a second connection device to an intermediate portion of said folding strut and extending therefrom into pivotal connection with said crank arm portion at a position substantially in line with said first and second connection devices when said gear is in extended position whereby to cause the control means initially to function solely on the folding strut and thereafter to react through the crank arm portion in swinging the main strut to its retracted position.

2. A retractable aircraft landing gear comprising a main strut pivotally mounted upon a stationary portion of the aircraft by means of a connection device and having a crank arm portion, a folding strut pivotally connected at one of its ends to said main strut at a position spaced from said connection device and at the other of its ends to a second stationary portion of said aircraft so as to provide a diagonal brace for said main strut when the gear is in extended position, and extensible-contractable control means such as a hydraulic jack pivotally mounted by means of a second connection device to an intermediate portion of said folding strut and extending therefrom into pivotal connection with said crank arm at a position substantially in line with said first and second connection devices when said gear is in extended position whereby the initial action of the control means will be confined to the collapsing of the folding strut and through the latter start the swinging of the main strut to its retracted position, said crank arm portion being so proportioned and arranged as to be adapted to rotate about said first mentioned connection device upon rotation of said main strut toward retracted position in directions away from said control means whereby the control means will react through the crank arm portion on the main strut to so swing the latter and thereby dispose the line of action of said control means at increasing distances away from said first mentioned connection device as said main strut moves from extended position toward retracted position.

3. A retractable aircraft landing gear comprising a main strut pivotally mounted upon a stationary portion of the aircraft by means of a connection device to extend substantially vertically therefrom when in gear extended position and having a crank arm portion, a folding strut pivotally connected at one of its ends to said main strut at a position spaced from said connection device and at the other of its ends to a second stationary portion of said aircraft so as to provide a diagonal brace for said main strut when the gear is in extended position, and extensible-contractable control means such as a hydraulic jack pivotally mounted by means of a second connection device to said folding strut for collapsing the same from an operative position and extending therefrom into pivotal connection with said crank arm portion at a position substantially in line with said first and second connection devices when said gear is in extended position whereby to confine the action of the control means solely to the folding strut to start the folding of the latter, said crank arm portion being disposed without such line by and during the initial folding movement of the folding strut thereby to provide a lever advantage for the reactionary force of the control means to assist in retracting the main strut.

4. A retractable aircraft landing gear comprising a main strut pivotally mounted upon a stationary portion of the aircraft by means of a connection device and having a crank arm portion, a folding strut pivotally connected at one of its ends to said main strut at a position spaced from said connection device and at the other of its ends to a second stationary portion of said aircraft so as to provide a diagonal brace for said main strut when the gear is in extended position, and extensible-contractable control means pivotally mounted by means of a second connection device to said folding strut for collapsing the latter from an operative position to retract the gear and extending the folding strut into pivotal connection with said crank arm portion, said second connection device being so positioned relative to said second stationary portion of said aircraft as to dispose the line of action of said control means at a substantial effective lever arm distance therefrom when said gear is in extended condition for so collapsing the folding strut, such effective lever arm decreasing to a minimum when the gear is retracted, and said crank arm portion being disposed with respect to the line of action of said control means to have a varying effective lever arm increasing to its maximum lever advantage when the gear is retracted.

5. A retractable aircraft leading gear comprising a main strut pivotally mounted upon a stationary portion of the aircraft by means of a connection device and having a crank arm portion, a folding strut pivotally connected at one of its ends to said main strut at a position spaced from said connection device and at the other of its ends to a second stationary portion of said aircraft so as to provide a diagonal brace for said main strut when the gear is in extended position, and extensible-contractable control means pivotally mounted by means of a second connection device to said folding strut in a manner to collapse the latter from its operative position and extending therefrom into pivotal connection with said crank arm portion, said second connection device being so positioned relative to said second stationary portion of said aircraft as to dispose the line of action of said control means at a substantial effective lever arm distance therefrom when said gear is in extended condition and at a relatively less effective lever arm distance when said gear is retracted, and said crank arm portion being so disposed to increase its effective lever arm inversely with the lessening of such effective lever arm distance whereby the reactionary force of the control means will increasingly urge the main strut to retract the gear.

6. A retractable aircraft landing gear comprising a main strut pivotally mounted upon a stationary portion of the aircraft by means of a connection device to extend substantially vertically therefrom when in gear extended position, a folding strut pivotally connected at one of its ends to said main strut at a position spaced from said connection device and at the other of its ends to a second stationary portion of said aircraft so as to provide a diagonal brace for said main strut when the gear is in extended position, extensible-contractable control means pivotally mounted by means of a second connection device to said folding strut to provide an effective lever arm for collapsing the latter from an operative position, said folding strut being adapted to fold and to nest with said control means completely within the aircraft during retraction of the gear with said effective lever arm decreasing in accordance with such folding action, and leverage means connecting the control means to the main strut, said leverage means being normally inoperative to provide an effective leverage when the main strut is operative and being rendered operable by and during the collapsing of the folding strut to provide an effective leverage increasing in inverse order with the decreasing of such effective lever arm whereby said control means may more readily effect the full retraction of the gear.

7. A retractable aircraft landing gear comprising a main strut pivotally mounted upon a stationary portion of the aircraft by means of a connection device to extend substantially vertically therefrom when in gear extended position, a folding strut pivotally connected at one of its ends to said main strut at a position spaced from said connection device and at the other of its ends to a second stationary portion of said aircraft to provide a diagonal brace for said main strut when the gear is in extended position, control means normally inoperatively related to said main strut when the gear is so extended and adapted to be operatively related to such main strut for acting directly thereon to retract the gear, said control means being operatively connected to the folding strut to collapse the same from an operative position, and means operable by and during the initial collapsing movement of the folding strut to so operatively relate the control means to said main strut.

EDWYN A. EDDY.